United States Patent
Doerry (10) Patent No.: US 6,765,526 B1
(45) Date of Patent: Jul. 20, 2004

(54) GMTI MOTION COMPENSATION

(75) Inventor: Armin W. Doerry, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/449,425

(22) Filed: May 29, 2003

(51) Int. Cl.$^7$ ............................................. G01S 13/52
(52) U.S. Cl. ...................................... 342/160; 342/161
(58) Field of Search ................................ 342/160, 161, 342/162, 163, 164, 190, 202, 203

(56) References Cited

U.S. PATENT DOCUMENTS

| | | | | |
|---|---|---|---|---|
| 3,480,953 A | * | 11/1969 | Shreve | 342/163 |
| 3,787,851 A | * | 1/1974 | Hughes | 342/161 |
| 4,048,637 A | | 9/1977 | Jacomini | 343/7.7 |
| 4,093,950 A | | 6/1978 | ap Rhys | 343/7.7 |
| 4,093,951 A | | 6/1978 | ap Rhys | 343/7.7 |
| 4,217,583 A | * | 8/1980 | Hiller et al. | 342/149 |
| 4,459,592 A | | 7/1984 | Long | 343/7 |
| 4,684,950 A | | 8/1987 | Long | 342/94 |
| 5,163,176 A | | 11/1992 | Flumerfelt et al. | 342/174 |
| 6,307,501 B1 | | 10/2001 | Wills et al. | 342/161 |

OTHER PUBLICATIONS

William J. Caputi, Jr. "Stretch: A Time–Transformation Technique"; Mar. 1971, pp. 269–278.

* cited by examiner

Primary Examiner—Thomas H. Tarcza
Assistant Examiner—Brian Andrea
(74) Attorney, Agent, or Firm—George H Libman (57) ABSTRACT

Movement of a GMTI radar during a coherent processing interval over which a set of radar pulses are processed may cause defocusing of a range-Doppler map in the video signal. This problem may be compensated by varying waveform or sampling parameters of each pulse to compensate for distortions caused by variations in viewing angles from the radar to the target.

9 Claims, 4 Drawing Sheets

GMTI MOTION COMPENSATION

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

Radar systems use time delay measurements between a transmitted signal and its echo to calculate the range to a target. Ranges that change with time cause a Doppler offset in phase and frequency of the echo. Consequently, the closing velocity between target and radar, which is also known as radial or line-of-sight velocity, is conventionally measured by measuring the Doppler offset of the echo. In a pulse-Doppler radar, Doppler frequency is measured as a linear phase shift over a set of radar pulses during some Coherent Processing Interval (CPI). The average time delay over the set of pulses corresponds to the reported range of a target.

Radars that detect and measure target velocity are known as Moving-Target-Indicator (MTI) radars. MTI radars that are operated from aircraft are often described as Airborne-MTI (AMTI) radars. When AMTI radars are used to detect and measure ground-based moving-target vehicles, they are often described as Ground-MTI (GMTI) radars. Good introductions to MTI radar operation are given in M. I. Skolnik, *Introduction to Radar Systems,* second edition, ISBN 0-07-057909-1, McGraw-Hill, Inc., 1980 and F. E. Nathanson, *Radar Design Principles,* second edition, ISBN 0-07-046052-3, McGraw-Hill, Inc., 1990. MTI systems with exceptionally fine range resolution are known as High Range Resolution (HRR) systems. HRR systems should have range resolution finer than the dimensions of the target vehicles to facilitate vehicle discrimination and identification.

Radar systems that employ the same antenna for transmitting and receiving echoes are termed monostatic radars. When transmit and receive antennas are separated, it is termed bistatic operation. Although two spaced antennas on a single platform could be bistatic, typically antennas for a bistatic system are on separate vehicles where both vehicles move with respect to each other and the target.

In all cases, pulse-Doppler radars require a multitude of pulses for processing to extract closing velocity information. Conventionally, the Pulse-Repetition-Frequency (PRF) is held constant over a CPI. Furthermore, the pulse waveform parameters of center frequency and chirp rate are held constant. This suffices since typical GMTI radars have generally coarse range resolutions (typically several meters to several tens of meters), and relatively short CPIs (typically small fractions of a second). Constant waveform parameters simplify the signal processing to extract range and velocity information.

A typical output of a GMTI radar is a range-Doppler map that is a plot of target range from the radar as a function of target velocity (in the range direction) with respect to the radar. With finer range resolutions and longer CPIs (especially with higher radar platform velocities) of modern high-performance GMTI systems (especially HRR GMTI systems), it is difficult to optimally focus the range-Doppler map and maximize the probability of detecting targets and identify their range and radial velocity. Target vehicles migrate through range and Doppler/velocity cells during the course of data collection. This movement, which is related to the range-migration and motion compensation problems in Synthetic Aperture Radar image formation, shows up on the range-Doppler map as a smear, rather than a desirable point.

An airborne GMTI system emits pulses and collects data while the radar is in motion; i.e., flying along a flight path. Each pulse represents data taken not only at a different time, but also taken from a different spatial location due to the motion of the aircraft. Consequently, a target with some constant closing velocity towards one pulse's spatial location will exhibit a different closing velocity towards a different pulse's spatial location. As a result, even for a constant velocity target, Doppler frequencies are not constant during the data collection interval along the flight path, and exhibit a migration of values as data is collected. Doppler resolution and estimation (which corresponds to velocity resolution and estimation) is therewith impaired.

R. W. Wills et al., U.S. Pat. No. 6,307,501, Oct. 23, 2001, "Radar systems", mention motion compensation for GMTI radar, but only in the context of centering a clutter map, and not for correcting migration effects. Waveform parameters such as chirp rate and center frequency are not discussed.

Similarly, T. L. ap Rhys, U.S. Pat. Nos. 4,093,950 and '951, Jun. 6, 1978, "Motion-compensation arrangements for MTI radars", also offers motion compensation during GMTI echo processing for multiple antenna arrays, employing "phase and amplitude adjustments", as well as delays, to stabilize clutter in the direction of the antenna boresight. Migration effects are not addressed.

L. R. Flumerfelt et al., U.S. Pat. No. 5,163,176, Nov. 10, 1992 "All weather tactical strike system (AWTSS) and method of operation", offer motion compensation by received signal "phase rotation". Constant phase rotations or shifts do not address problematic migration for the radar systems addressed by this disclosure.

D. C. Schleher, *MTI and Pulsed Doppler Radar,* ISBN 0-89006-320-6, Arthech House, Inc., 1991, indicates that the principal use of motion compensation is to force clutter responses to an effective Doppler frequency of zero. Migration is not addressed.

Bistatic GMTI systems are also addressed by M. W. Long, U.S. Pat. No. 4,459,592, Jul. 10, 1984 "Methods of and circuits for suppressing Doppler radar clutter" and U.S. Pat. No. 4,684,950, Aug. 4, 1987, "Methods of and circuits for suppressing Doppler radar clutter". Long is principally concerned with clutter suppression and defers any detailed discussion of motion compensation, stating techniques "are a well-established part of the radar art".

O. J. Jacomini, U.S. Pat. No. 4,048,637, Sep. 13, 1977, "Radar system for detecting slowly moving targets", reveals a bistatic motion compensation scheme to control clutter spectrum width by forcing separate aircraft to fly opposite angular velocities. However, no mention of migration effects is made. Waveform parameters such as chirp rate and center frequency are not discussed.

SUMMARY OF THE INVENTION

It is an object of this invention to adjust some combination of transmitted waveform parameters and digital sampling parameters as a function of the instantaneous geometry of the data collection to focus the range-Doppler map of a GMTI radar.

To achieve the foregoing and other objects, and in accordance with the purpose of the present invention, as embodied and broadly described herein, a method is provided of compensating for defocusing of range-Doppler map in a GMTI video signal caused by movement of radar during a coherent processing interval over which a set of radar pulses are processed. Waveform or sampling parameters of each pulse are varied to compensate for distortions caused by changes in viewing angles from the radar to the target.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Two embodiments of the invention are described; monostatic and bistatic.

Monostatic GMTI

GMTI systems relate Doppler frequency to the relative velocity between a radar and a moving target. GMTI systems typically measure Doppler by emitting and collecting data from a sequence of pulses at a pulse-repetition frequency (PRF), and by measuring the pulse-to-pulse phase shift in the target returns. While Doppler also manifests itself in other ways, a pulse-to-pulse phase shift is nevertheless the principal effect measured by typical GMTI systems.

An ideal GMTI system holds the combined transmit TX and receive RX antenna fixed in space, with no motion of its own. For such a fixed-to-the-ground system, all measured Doppler frequency shift is due to target motion; specifically, the target's closing velocity with the radar. A target with constant closing velocity exhibits constant Doppler shift.

An airborne GMTI system, however, emits pulses and collects data while the radar is in motion, i.e. flying along some flight path. Each received pulse represents data taken not only at a different time, but also from a different spatial location. A target with some constant closing velocity towards one pulse's spatial location will exhibit a different closing velocity towards a different pulse's spatial location. As a result, Doppler frequencies are not constant during the data collection interval along the flight path, and Doppler resolution and estimation (which corresponds to velocity resolution and estimation) is impaired.

Recall that Doppler is measured as a pulse-to-pulse phase shift. Note also that the amount of phase shift depends on the wavelength (or frequency) of the radar. Phase shifts are proportional to frequency. As taught by this invention, the effects in the data of variations in velocity due to the radar's changing positions can be compensated by adjusting radar waveform parameters (including frequency) in a complementary fashion to 'stabilize' radar signal phase-shifts. This compensation is called "range stabilization" hereinafter.

Figure 1:
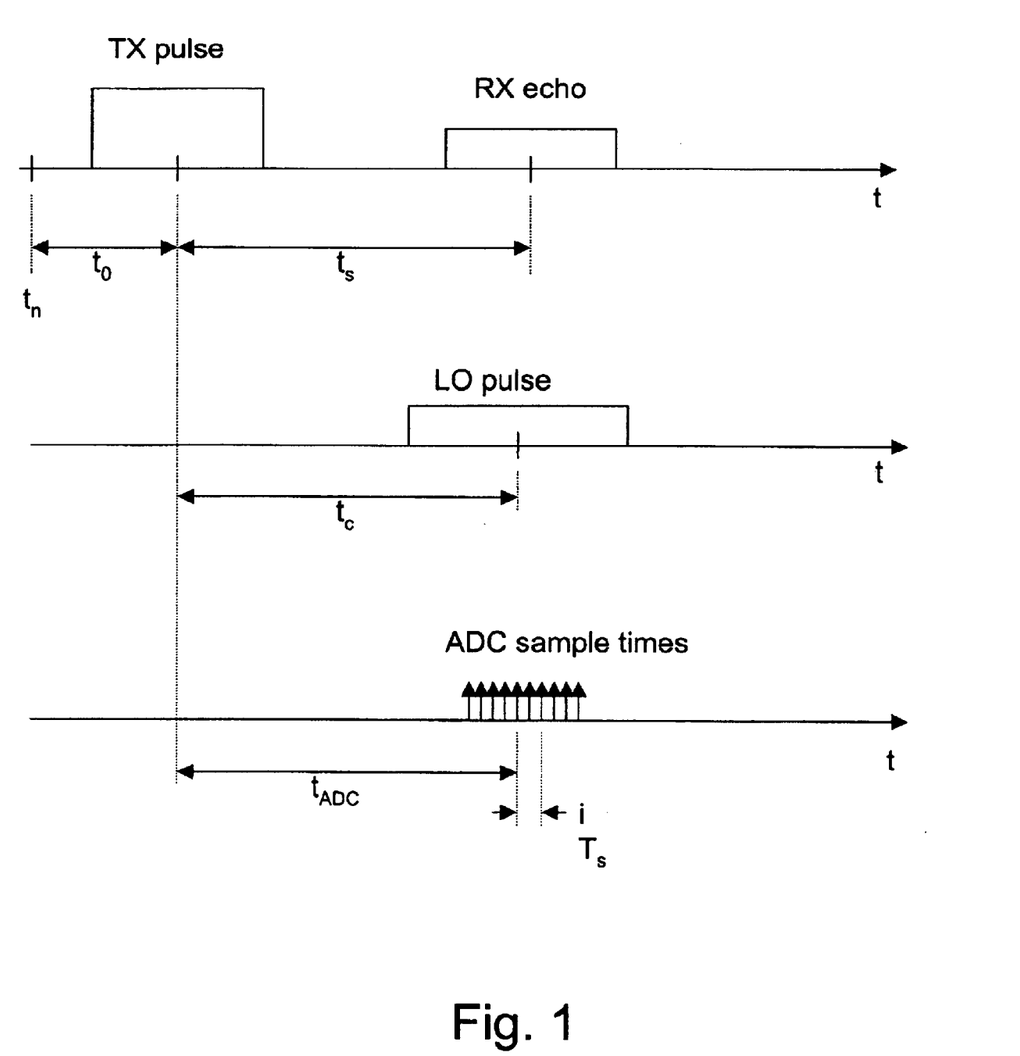
FIG. 1. Timing diagram showing relationship of timing parameters.
Figure 2:
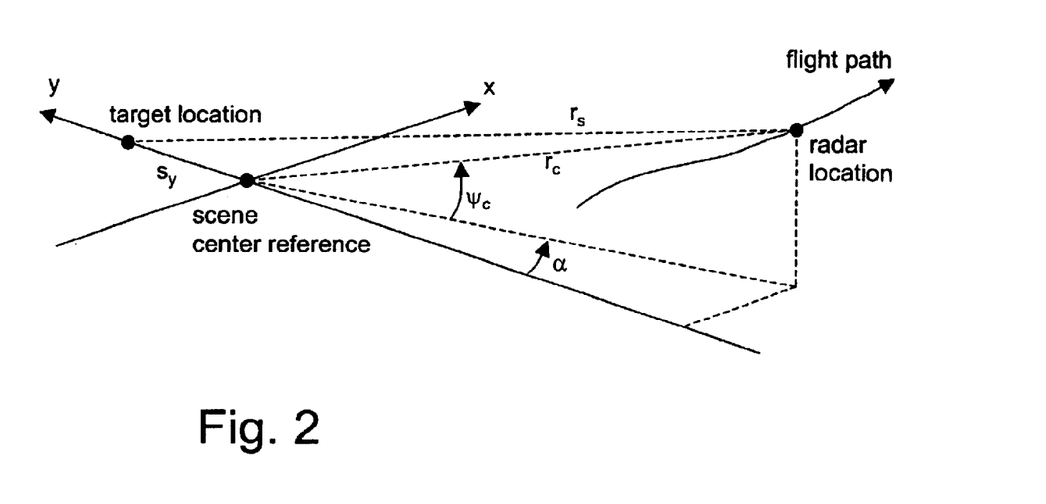
FIG. 2. Monostatic GMTI geometry.

As is known to those of ordinary skill in the radar art, and with reference to FIGS. 1 and 2, the phase of the transmitted signal using a Linear-FM (LFM) chirp can be described as $$\Phi_T = \left\{\omega_{T,n}(t - t_0 - t_n) + \frac{\gamma_{T,n}}{2}(t - t_0 - t_n)^2\right\} \tag{1}$$

where $\omega_{T,n}$ and $\gamma_{T,n}$ are respectively the transmitted waveform's center frequency and chirp rate for the nth pulse, t is time, $t_n$ is a reference time for the nth pulse, and $t_0$ is the offset of the center of the transmitted pulse from time $t_n$.

The received echo is a time-delayed version of the transmitted signal with phase $$\Phi_R = \left\{\omega_{T,n}(t - t_0 - t_n - t_s) + \frac{\gamma_{T,n}}{2}(t - t_0 - t_n - t_s)^2\right\} \tag{2}$$

where $t_s$ is the delay of the echo from a target reflector. Since the radar system processing is linear, then superposition holds for the returns from multiple targets, allowing us to deal with but a single response as representative.

By employing well-known "stretch processing" (see, for example, W. J. Caputi Jr., "Stretch: A Time-Transformation Technique", IEEE Transactions on Aerospace and Electronic Systems, Vol. AES-7, No. 2, pp 269–278, March 1971), the received echo from a target is de-chirped prior to sampling. Furthermore, the resulting signal can be processed with a quadrature demodulator prior to sampling. Mathematically, this processing is equivalent to mixing the received signal with a Local Oscillator (LO) with phase $$\Phi_{LO} = \left\{\omega_{L,n}(t - t_0 - t_n - t_c) + \frac{\gamma_{L,n}}{2}(t - t_0 - t_n - t_c)^2\right\} \tag{3}$$

where $\omega_{L,n}$ and $\gamma_{L,n}$ are respectively the transmitted waveform's center frequency and chirp rate for the nth pulse, and $t_c$ is the time delay of this signal from the transmitted signal.

The local oscillator delay parameter $t_c$ is selected to be the time delay corresponding to the two-way range to the scene center reference point (a point defining the center of the area being scanned by the radar) and is calculated by $$t_c = \frac{2r_c}{c} \tag{4}$$

where $r_c$ is the measure of range to the scene center reference point.

With this model, the phase of the resulting complex video signal is the difference between the received signal's phase and the LO signal's phase. If $\omega_{L,n}=\omega_{T,n}$ and $\gamma_{L,n}=\gamma_{T,n}$ for each pulse, then $$\Phi_v = \tag{5}$$

$$\Phi_R - \Phi_{LO} = \left\{-[\omega_{T,n} + \gamma_{T,n}(t - t_0 - t_n - t_c)](t_s - t_c) + \frac{\gamma_{T,n}}{2}(t_s - t_c)^2\right\}.$$

The residual video phase error term $$\frac{\gamma_{T,n}}{2}(t_s - t_c)^2$$

is generally small and can often be ignored. When significant, it may also be compensated by well-known techniques, as taught by W. G. Carrara et al., *Spotlight Synthetic Aperture Radar, Signal Processing Algorithms*, ISBN 0-89006-728-7, Artech House, Inc., 1995.

The analog video signal is converted to digital data by sampling at times $$t = t_n + t_0 + t_{ADC,n} + iT_{s,n} \quad (6)$$

where $t_{ADC,n}$ is the offset from the transmitted pulse reference time of the sampling pulse reference time, $T_{s,n}$ is the time spacing between adjacent data samples, and i is an index detailing the sample number within any one pulse. The relationship of these radar timing parameters is illustrated in FIG. 1.

Recognizing that the time difference $(t_s - t_c)$ corresponds to radar/target geometry and motion as $$(t_s - t_c) \approx \frac{2}{c} \cos\psi_{c,n} \cos\alpha_n [-s_{y,0} - v_{y,0}(t_n + t_0 + t_{ADC,n} - t_{v,ref})] \quad (7)$$

where for pulse n we measure $\psi_{c,n}$ as the elevation angle of the radar's position, $\alpha_n$ is the azimuth offset from the −y axis of the radar's position, $s_{y,0}$ is the y axis position of the target at time offset $t_{v,ref}$, and $v_{y,0}$ is the velocity of the target in the +y axis direction. The constant c is the well-known velocity of microwave propagation. The −y axis runs beneath the radar at pulse index n=0. Monostatic GMTI geometry is illustrated in FIG. 2.

The sampled video signal's phase can be approximated as $$\Phi_V \approx \left\{\frac{2}{c}[\omega_{T,n} + \gamma_{T,n}(iT_{s,n} + t_{ADC,n} - t_{c,n})]\cos\psi_{c,n}\cos\alpha_n[-s_{y,0} - v_{y,0}(t_n + t_0 + t_{ADC,n} - t_{v,ref})]\right\}. \quad (8)$$

Data characterized with this target phase function are processed with transform techniques in a manner well known in the art to extract target range-direction offset $s_{y,0}$ and velocity $v_{y,0}$ in a range-Doppler plot. The azimuthal position of the target is normally presumed to be in the center elevation axis of the antenna beam at n=0, which normally coincides with the y axis.

The typical assumption is for radar viewing angles $\psi_{c,n}$ and $\alpha_n$ to be considered constant. However, this assumption is no longer valid when the radar is moving relatively quickly compared with the parameters of the transmitted signal. The variation in radar viewing angles during the course of data collection is embodied in the dependence of angles $\psi_{c,n}$ and $\alpha_n$ on pulse index n. These variations cause perturbations in the target echo phase that degrade estimating target range-direction offset $s_{y,0}$ and velocity $v_{y,0}$ via normal transform methods.

The essence of this invention is to modify the radar transmitted pulses to compensate distortions caused by variations over a constant pulse interval in viewing angles $\psi_{c,n}$ and $\alpha_n$. These modifications may be to any of the transmitted wave, the receiver local oscillator output, or the processing of the received wave.

The goal is to force the relationship $$[\omega_{T,n} + \gamma_{T,n}(iT_{s,n} + t_{ADC,n} - t_{c,n})]\cos\psi_{c,n}\cos\alpha_n = [\omega_0 + \gamma_0(iT_{s,0} + t_{ADC,0} - t_{c,0})]\cos\psi_{c,0} \quad (9)$$

where $\omega_0$ and $\gamma_0$ are nominal constant frequency and chirp rate, respectively, $\psi_{c,0}$ is a nominal constant elevation angle, and $T_{s,0}$, $t_{ADC,0}$, and $t_{c,0}$ are also their respective nominal constant values. The left side of the equation is part of the video signal of equation (8). The right side of the equation no longer has any dependence on pulse number n. This removal of dependence on pulse number n from equation (8) both focuses the image and facilitates simplified processing of GMTI data by standard transform techniques.

One way to accomplish this goal is to modify the transmitted waveform frequency and chirp-rate parameters on a pulse-to-pulse basis such that $$\omega_{T,n} = \kappa_n\omega_0 \text{ and } \gamma_{T,n} = \kappa_n\gamma_0 \quad (10)$$

where the scale factor $\kappa_n$ changes on a pulse-to-pulse basis in accordance with aircraft (radar) position, via $$\kappa_n = \frac{\cos\psi_{c,0}}{\cos\psi_{c,n}\cos\alpha_n}. \quad (11)$$

Modern radars routinely measure this position information, so adjusting waveform parameters in this manner can be achieved with modern programmable Digital Waveform Synthesizers, such as P. Dudley et al., *Multiplexed Chirp Waveform Synthesizer*, Ser. No. 09/238,762, filed Jan. 28, 1999, and assigned to the assignee of this invention.

With this processing, timing parameters are held constant, that is $$T_{s,n} = T_{s,0}; \ t_{ADC,n} = t_{ADC,0}; \text{ and } t_{c,n} = t_{c,0}. \quad (12)$$

This stabilizes the received target echo's phase to $$\Phi_V \approx \left\{\frac{2}{c}[\omega_0 + \gamma_0(iT_{s,0} + t_{ADC,0} - t_{c,0})]\cos\psi_{c,0}[-s_{y,0} - v_{y,0}(t_n + t_0 + t_{ADC,0} - t_{v,ref})]\right\}. \quad (13)$$

A constant PRF is embodied in the mathematical dependency $t_n = nT_p$ which yields $$\Phi_V \approx \left\{\frac{2}{c}[\omega_0 + \gamma_0(iT_{s,0} + t_{ADC,0} - t_{c,0})]\cos\psi_{c,0}[-s_{y,0} - v_{y,0}(nT_p + t_0 + t_{ADC,0} - t_{v,ref})]\right\}. \quad (14)$$

Note that in this expression, the only dependence of the data on pulse position n is its single occurrence due to the constant PRF. Furthermore, this is a linear dependence, implying that a constant velocity $v_{y,0}$ corresponds to a single constant frequency (the derivative of phase with respect to n is a constant), thereby facilitating desirable processing with simple frequency extraction transform techniques such as the FFT.

Accordingly, radar data is stabilized by adjusting waveform parameters.

An alternate scheme would vary timing parameters instead of waveform frequency and chirp rate in the following manner $$T_{s,n} = \kappa_n T_{s,0} \text{ and } t_{ADC,n} = (\kappa_n - 1)\left(\frac{\omega_0}{\gamma_0} - t_{c,0}\right) + \kappa_n t_{ADC,0} \quad (15)$$

where it has been presumed that $t_{c,n} = t_{c,0}$.

One skilled in the art can see that there are a multitude of combinations of things to vary in order to cause the equivalence of equation (9).

While this stabilizes range, there is a secondary effect worth noting with this alternate scheme. Namely, the target phase model with these timing adjustments substituted becomes $$\Phi_V \approx \left\{\begin{array}{l}\frac{2}{c}[\omega_0 + \gamma_0(iT_{s,0} + t_{ADC,0} - t_{c,0})] \times \\ \cos\psi_{c,0}\left[-s_{y,0} - v_{y,0}\left(t_n + t_0 + (\kappa_n - 1)\left(\frac{\omega_0}{\gamma_0} - t_{c,0}\right) + \kappa_n t_{ADC,0} - t_{v,ref}\right)\right]\end{array}\right\} \quad (16)$$

Now, if we require a phase that is linear in index n, of the form presented earlier, then we need to select pulse sample times at $$t_n = nT_p - \left((\kappa_n - 1)\left(\frac{\omega_0}{\gamma_0} - t_{c,0}\right) + \kappa_n t_{ADC,0}\right). \quad (17)$$

This will achieve the target's phase to be represented in the data asset forth in equation (14).

But for this embodiment, the radar's PRF is not constant, that is, the pulse reference times must vary depending on radar motion, so that the target's phase in the data is made linear with respect to n.

Data not collected as described above can be interpolated and adjusted to the ideal form. Such collection, however, necessitates a substantial overhead in additional processing, thereby decreasing substantially the efficiency of the overall processing to extract the information desired.

For example, if data is collected consistent with equation (16) but with $t_n = nT_p$, then it can be resampled to a new data set identified with a new index n', such that $$nT_p = n'T_p - \left((\kappa_n - 1)\left(\frac{\omega_0}{\gamma_0} - t_{c,0}\right) + \kappa_n t_{ADC,0}\right). \quad (18)$$

Figure 3:
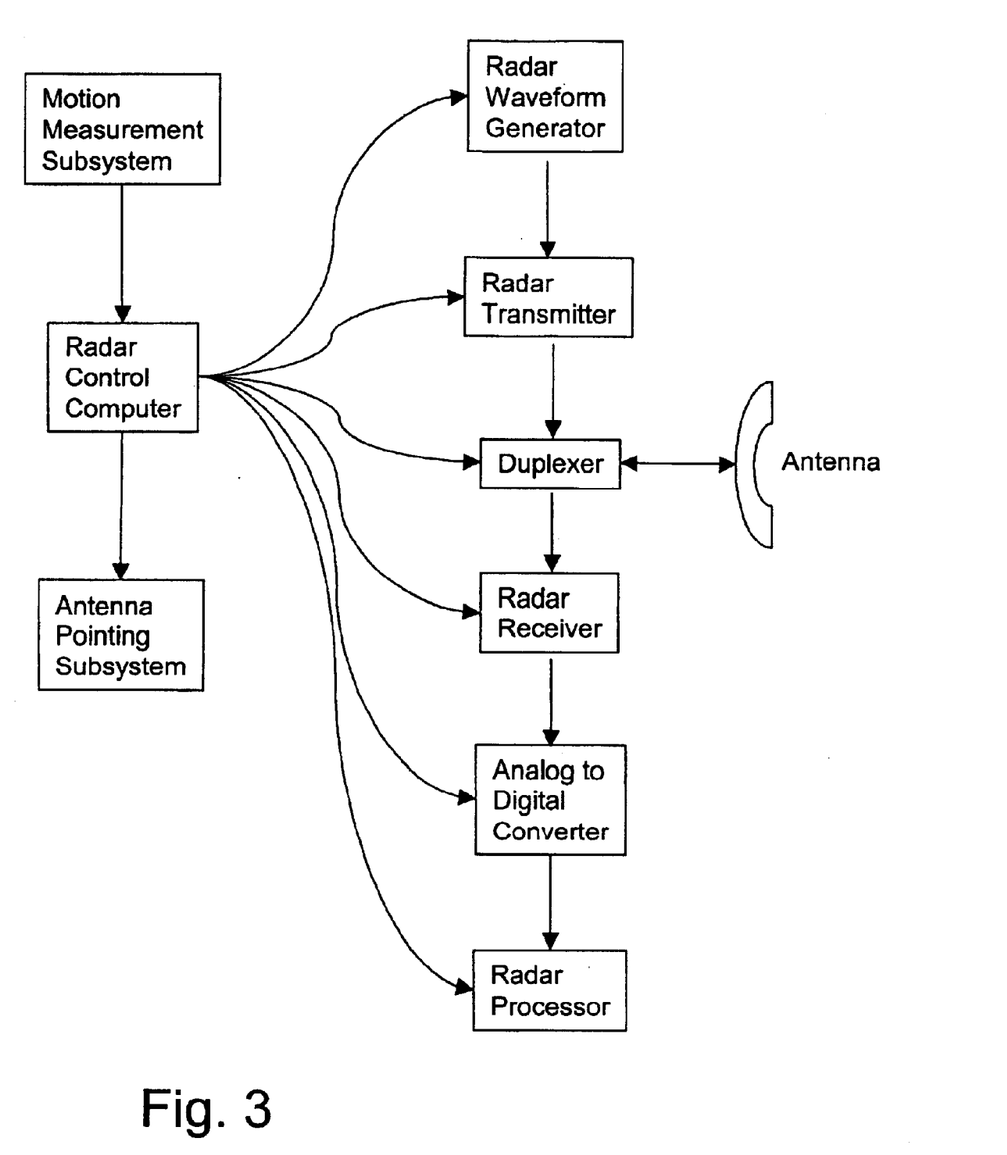
FIG. 3. Block diagram of Monostatic GMTI radar employing motion compensation.

A block diagram showing one embodiment of a monostatic GMTI radar employing the technique of this disclosure is given in FIG. 3. In this embodiment the Motion Measurement Subsystem continually measures the position and motion of the radar system, and provides this information as well as short-term predictions of the radar position and motion to the Radar Control Computer. Using this information, the Radar Control Computer configures the radar and commands all aspects of its operation. It chooses also the ground position to be monitored for the duration of a CPI, and controls the Antenna Pointing Subsystem to illuminate that ground position. During transmit mode, the radar control computer uses equations 10 and 11 to calculate and program the Radar Waveform Generator with the appropriate waveform to be transmitted. The Radar Transmitter boosts the power of the waveform and sends the energy through the Duplexer to the Antenna. The Duplexer alternately connects the single antenna to the Radar Transmitter and Radar Receiver at the command of the Radar Control Computer. During receive mode, the Radar Receiver collects signals from the Antenna via the Duplexer, and forwards them to the Analog to Digital Converter which converts the signals to digital data sampled at times controlled by the Radar Control Computer using equation 12. The radar control computer repeats this cycle in a manner to generate a constant PRF, thereby causing the data to be adequately modeled with phase given by equation 14. The Radar Processor collects this data and performs GMTI processing in a conventional manner, but upon data with improved quality. The position measuring, antenna pointing, and radar controllers are conventional elements of precision synthetic aperture radars. The additional computations for this invention are easily implemented by those of ordinary skill in this field.

Bistatic GMTI

Figure 4:
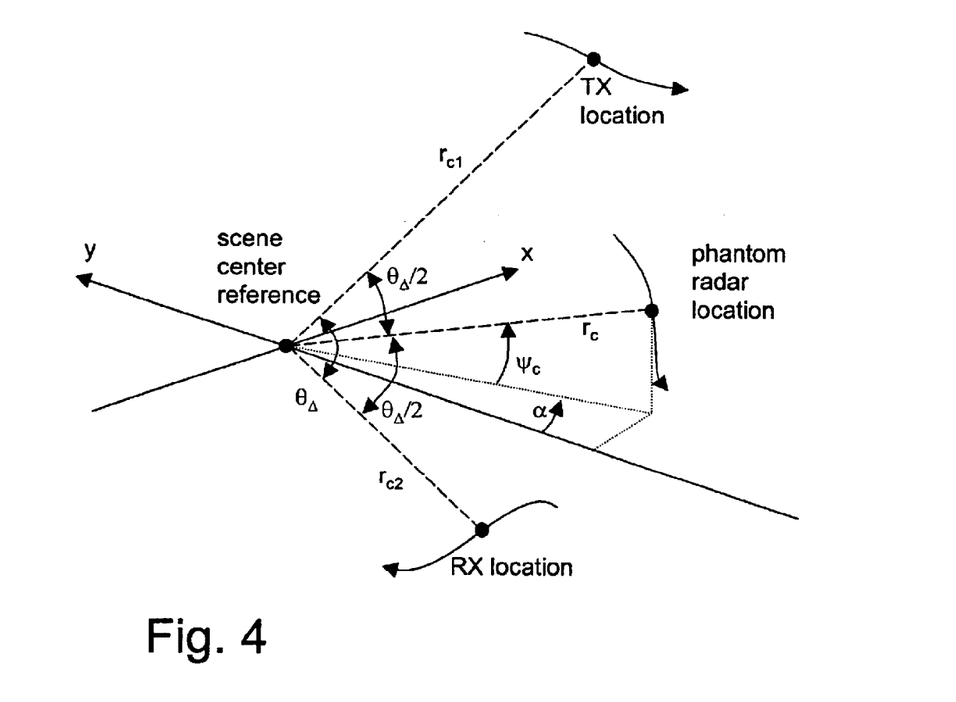
FIG. 4. Bistatic GMTI geometry.

As represented in FIG. 4, in the bistatic case, the transmitter and receiver are at different spatial locations where $r_{c1}$ and $r_{c2}$ are, respectively, the independent ranges from the scene reference point to the transmitter and receiver. Accordingly, the delay parameter corresponding to the time it takes a pulse to travel from the transmitter to the reference point and to the receiver is now $$t_c = \frac{r_{c1} + r_{c2}}{c}. \qquad (19)$$

An equivalent range $r_c$ is defined as the mean of $r_{c1}$ and $r_{c2}$, namely $$r_c = \frac{c}{2} t_c = \frac{r_{c1} + r_{c2}}{2}. \qquad (20)$$

A fictitious or phantom radar spatial location is defined as being determined by the range $r_c$ and a direction that bisects the bistatic angle $\theta_\Delta$ between transmitter and receiver as viewed from the scene center reference point. The angles $\psi_{c,n}$ and $\alpha_n$ are pulse-to-pulse measures of the direction of this phantom point, and correspond to similar angles in the monostatic embodiment discussed above. The $-y$ axis now corresponds to beneath the phantom point at pulse number $n=0$.

With these definitions, the video phase (bistatic equivalent of equation (8)) becomes $$\Phi_V \approx \left\{ \begin{array}{l} \frac{2}{c}[\omega_{T,n} + \gamma_{T,n}(iT_{s,n} + t_{ADC,n} - t_{c,n})] \times \\ \cos\left(\frac{\theta_{\Delta,n}}{2}\right)\cos\psi_{c,n}\cos\alpha_n[-s_{y,0} - v_{y,0}(t_n + t_0 + t_{ADC,n} - t_{v,ref})] \end{array} \right\}. \qquad (21)$$

In a manner similar to the monostatic case, the goal is now to force the relationship $$[\omega_{T,n} + \gamma_{T,n}(iT_{s,n} + t_{ADC,n} - t_{c,n})]\cos\left(\frac{\theta_{\Delta,n}}{2}\right)\cos\psi_{c,n}\cos\alpha_n = [\omega_0 + \gamma_0(iT_{s,0} + t_{ADC,0} - t_{c,0})]\cos\left(\frac{\theta_{\Delta,0}}{2}\right)\cos\psi_{c,0} \qquad (22)$$

where $\omega_0$ and $\gamma_0$ are nominal constant frequency and chirp rate, respectively, $\psi_{c,0}$ is a nominal constant elevation angle, $\theta_{\Delta,0}$ is a nominal constant bistatic angle, and $T_{s,0}$, $t_{ADC,0}$, and $t_{c,0}$ are also their respective nominal constant values. Note that the right side of the equation is well-behaved in that it no longer has any dependence on pulse number n. This removal of dependence on pulse number n is desirable to facilitate simplified processing of GMTI data by transform techniques.

As with the monostatic case, one way to accomplish this is to modify transmitted waveform frequency and chirp-rate parameters on a pulse-to-pulse basis such that $$\omega_{T,n}=\kappa_n\omega_0 \text{ and } \gamma_{T,n}=\kappa_n\gamma_0 \qquad (23)$$

An alternate scheme would vary timing parameters instead of waveform frequency and chirp rate such that $$T_{s,n} = \kappa_n T_{s,0} \text{ and } t_{ADC,n} = (\kappa_n - 1)\left(\frac{\omega_0}{\gamma_0} - t_{c,0}\right) + \kappa_n t_{ADC,0} \qquad (24)$$

where it has been presumed that $t_{c,n}=t_{c,0}$.

One skilled in the art can see that there are a multitude of combinations of things to vary, but all still for the purpose of satisfying equation 22.

The only difference between the bistatic case and the monostatic case is that now the aforementioned corrections to stabilize the data now optimally require $$\kappa_n = \frac{\cos\left(\frac{\theta_{\Delta,0}}{2}\right)\cos\psi_{c,0}}{\cos\left(\frac{\theta_{\Delta,n}}{2}\right)\cos\psi_{c,n}\cos\alpha_n}. \qquad (25)$$

This allows the data model to be stabilized to $$\Phi_V \approx \left\{\frac{2}{c}[\omega_0 + \gamma_0(iT_{s,0} + t_{ADC,0} - t_{c,0})]\cos\left(\frac{\theta_{\Delta,0}}{2}\right)\cos\psi_{c,0}[-s_{y,0} - v_{y,0}(nT_p + t_0 + t_{ADC,0} - t_{v,ref})]\right\}. \qquad (26)$$

Again, the phase is linear in index n, implying that a constant velocity $v_{y,0}$ yields a desirable constant Doppler frequency measure.

Figure 5:
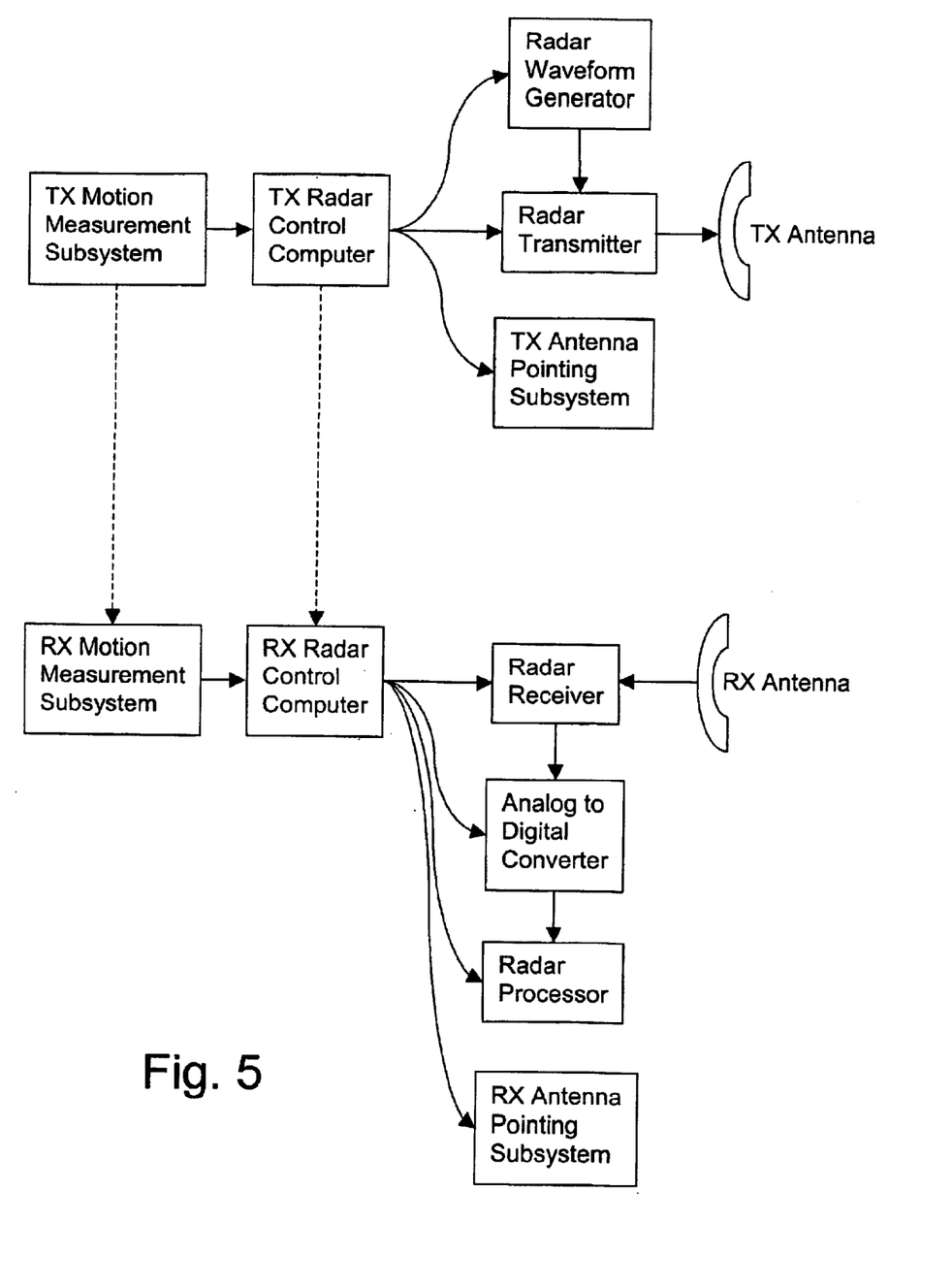
FIG. 5. Block diagram of Bistatic GMTI radar employing motion compensation.

FIG. 5 shows a block diagram of one embodiment of a Bistatic GMTI radar system employing motion compensation. In this embodiment the transmitter (TX) and receiver (RX) systems are physically separated, perhaps on different aircraft and/or spacecraft. Transmitter motion is continually measured by the TX Motion Measurement Subsystem. This data is provided to the TX Control Computer which configures and commands all aspects of the transmitter system. In this embodiment we presume that radar waveform parameters are held constant and the PRF is constant. The radar waveform is generated by the Radar Waveform Generator and amplified by the Radar Transmitter, which in turn provides the amplified signal for emission by the TX Antenna. The TX antenna is oriented by the TX Antenna Pointing Subsystem which is also controlled by the TX Radar Control Computer to illuminate the ground location of interest. It is presumed that the transmitter has no knowledge of receiver system operation or motion.

The receiver system, though separated from the transmitter system, is made aware of the transmitter motion, waveform, and timing parameters. This can be accomplished via prior arrangement, or by data transmission over some data link, or similar means. The RX Motion Measurement Subsystem continually monitors receiver motion, and combined with transmitter motion data continually calculates the instantaneous position and motion of the Phantom Point, as well as the bistatic angle. This information is provided to the RX Radar Control Computer which configures and commands all aspects of the receiver system. The RX antenna is oriented by the RX Antenna Pointing Subsystem which is also controlled by the RX Radar Control Computer to monitor the ground location of interest. Radar echo energy is received by the RX Antenna and applied to the Analog to Digital Converter via the Radar Receiver. The RX Radar Control computer uses the motion information along with knowledge of the transmitter system waveform parameters and timing to calculate optimal sampling times for the Analog to Digital Converter using equations 15 and 23. The Radar Processor resamples the data according to equation 19 and then performs GMTI processing in a more-or-less conventional manner, but upon data with improved quality.

It should be apparent that there are many modifications possible with this invention, as long as the concept of varying waveform or sampling parameters of each GMTI pulse to compensate for distortions caused by variations in viewing angles from the radar to the target is followed. It is intended that the scope of the invention be defined by the appended claims.

What is claimed is:

1. A method of compensating for defocusing of range-Doppler map in a GMTI radar video signal caused by movement of radar during a coherent processing interval over which a set of radar pulses are processed, comprising varying waveform or sampling parameters of each pulse on a pulse-to-pulse basis to compensate for distortions caused by variations in viewing angles from the radar to the target.

2. The method of claim 1 wherein for a monostatic radar.

$$[\omega_{T,n}+\gamma_{T,n}(iT_{s,n}+t_{ADC,n}-t_{c,n})]\cos\psi_{c,n}\cos\alpha_n = [\omega_0+\gamma_0(iT_{s,0}+t_{ADC,0}-t_{c,0})]\cos\psi_{c,0}$$

where for each pulse n, $\psi_{c,n}$ is the elevation angle of the radar's position, $\alpha_n$ is the azimuth offset from the $-y$ axis of the radar's position $\omega_{T,n}$ is the reference center frequency of the transmitted signal for each pulse n; $\gamma_{T,n}$ is the chirp rate for each transmitted pulse; $\omega_0$ is a nominal constant frequency rate, $\gamma_0$ is a nominal constant chirp rate, i is a count integer of sampling pulses, $\psi_{c,0}$ is a nominal constant elevation angle, $T_{s,0}$ is nominal time between adjacent sampling pulses, $t_{ADC,0}$ is the offset from the transmitted pulse reference time of the sampling pulse reference time, $t_{c,0}$ is the time delay corresponding to the two-way range to the scene center reference point.

3. The method of claim 1 wherein the transmitted waveform frequency and chirp rate are the parameters that are varied on a pulse-to-pulse basis.

4. The method of claim 2 wherein the transmitted waveform frequency and chirp rate are the parameters that are varied on a pulse-to-pulse basis such that $\omega_{T,n}=\kappa_n\omega_0$ and $\gamma_{T,n}=\kappa_n\gamma_0$ where the scale factor $\kappa_n$ changes on a pulse-to-pulse basis in accordance with radar position, via $$\kappa_s = \frac{\cos\psi_{c,0}}{\cos\psi_{c,n}\cos\alpha_s}.$$

5. The method of claim 4 wherein $T_{s,n}=T_{s,0}$; $t_{ADC,n}=t_{ADC,0}$; and $t_{c,n}=t_{c,0}$, and $t_n=nT_p$.

6. The method of claim 4 wherein timing parameters are varied, such that $$T_{s,n} = \kappa_n T_{s,0} \text{ and } t_{ADC,n} = (\kappa_n - 1)\left(\frac{\omega_0}{\gamma_0} - t_{c,0}\right) + \kappa_n t_{ADC,0},$$

where $t_{c,n} = t_{c,0}$ and $\kappa_n = \frac{\cos\psi_{c,0}}{\cos\psi_{c,n}\cos\alpha_n}.$ 7. The method of claim 1 wherein for a bistatic radar where the radar transmitter and receiver are at different spatial locations defined by vectors intersecting at an angle $\theta_\Delta$ as viewed from a central reference point, and $$[\omega_{T,n} + \gamma_{T,n}(iT_{s,n} + t_{ADC,n} - t_{c,n})]\cos\left(\frac{\theta_{\Delta,n}}{2}\right)\cos\psi_{c,n}\cos\alpha_n = [\omega_0 + \gamma_0(iT_{s,0} + t_{ADC,0} - t_{c,0})]\cos\left(\frac{\theta_{\Delta,0}}{2}\right)\cos\psi_{c,0},$$

where $\omega_{T,n}$ is the reference center frequency of the transmitted signal for each pulse n, $\gamma_{T,n}$ is the chirp rate for each transmitted pulse, $t_{ADC,n}$ is the offset from the transmitted pulse reference time of the sampling pulse reference time, $T_{s,n}$ is the time spacing between adjacent data samples, i is an index detailing the sample number within any one pulse, $\omega_0$ and $\gamma_0$ are nominal constant frequency and chirp rate, respectively, $\omega_{c,0}$ is a nominal constant elevation angle, $\theta_{\Delta,0}$ is a nominal constant bistatic angle, and $T_{s,0}$, $t_{ADC,0}$, and $t_{c,0}$ are nominal constant values.

8. The method of claim 7 wherein the transmitted waveform frequency and chirp rate are the parameters that are varied on a pulse-to-pulse basis such that $\omega_{T,n}=\kappa_n\omega_0$ and $\gamma_{T,n}=\kappa_n\gamma_0$ where the scale factor $\kappa_n$ changes on a pulse-to-pulse basis in accordance with position, via $$\kappa_n = \left[\cos\left(\frac{\theta_{\Delta,0}}{2}\right)\cos\psi_{c,0}\right] / \left[\cos\left(\frac{\theta_{\Delta,n}}{2}\right)\cos\psi_{c,n}\cos\alpha_n\right].$$

9. The method of claim 7 wherein timing parameters are varied on a pulse-to-pulse basis such that $$T_{s,n} = \kappa_n T_{s,0} \text{ and } t_{ADC,n} = (\kappa_n - 1)\left(\frac{\omega_0}{\gamma_0} - t_{c,0}\right) + \kappa_n t_{ADC,0},$$

where the scale factor $\kappa_n$ changes on a pulse-to-pulse basis in accordance with radar position, via $$\kappa_n = \left[\cos\left(\frac{\theta_{\Delta,0}}{2}\right)\cos\psi_{c,0}\right] / \left[\cos\left(\frac{\theta_{\Delta,n}}{2}\right)\cos\psi_{c,n}\cos\alpha_n\right].$$

* * * * *